US011927833B2

(12) United States Patent
Binder

(10) Patent No.: US 11,927,833 B2
(45) Date of Patent: Mar. 12, 2024

(54) SPECTACLES AND USE OF SPECTACLES HAVING A SPECTACLE FRAME AND AN ADDITIONAL FRAME

(71) Applicant: Andreas Binder, Baden (CH)

(72) Inventor: Andreas Binder, Baden (CH)

( * ) Notice: Subject to any disclaimer, the term of this patent is extended or adjusted under 35 U.S.C. 154(b) by 767 days.

(21) Appl. No.: 16/971,793

(22) PCT Filed: Jan. 11, 2019

(86) PCT No.: PCT/EP2019/050625
§ 371 (c)(1),
(2) Date: Aug. 21, 2020

(87) PCT Pub. No.: WO2019/161988
PCT Pub. Date: Aug. 29, 2019

(65) Prior Publication Data
US 2020/0393697 A1    Dec. 17, 2020

(30) Foreign Application Priority Data
Feb. 23, 2018 (CH) .............................. 00220 / 2018

(51) Int. Cl.
*G02C 5/00* (2006.01)
*G02C 1/00* (2006.01)
*G02C 7/08* (2006.01)
*G02C 7/06* (2006.01)

(52) U.S. Cl.
CPC .............. *G02C 5/008* (2013.01); *G02C 1/10* (2013.01); *G02C 7/088* (2013.01); *G02C 7/06* (2013.01)

(58) Field of Classification Search
CPC .......... G02C 5/008; G02C 1/10; G02C 7/088; G02C 7/06; G02C 7/086; G02C 9/04
See application file for complete search history.

(56) References Cited

U.S. PATENT DOCUMENTS

| 4,101,208 A | 7/1978 | Page |
| 5,017,001 A | 5/1991 | Kooketsu |
| 5,080,475 A | 1/1992 | Ferron |
| 5,118,178 A | 6/1992 | Tuckman |
| 5,696,571 A | 12/1997 | Spencer et al. |

(Continued)

FOREIGN PATENT DOCUMENTS

| EP | 0974860 A1 | 1/2000 |
| EP | 0596896 B1 | 11/2001 |
| WO | 2007061389 A1 | 5/2007 |

*Primary Examiner* — James C. Jones
(74) *Attorney, Agent, or Firm* — Brian Roffe

(57) ABSTRACT

Spectacles having a spectacle frame and at least one additional frame that can be placed on the front of the spectacle frame so as to be removable, both frames having lenses made of transparent material. The lenses of the spectacle frame are varifocal lenses for the purpose of correcting vision for different distance ranges in order to achieve in each case maximum or clear visual acuity for at least one distance range, while the lenses of the additional frame are single-vision lenses or varifocal lenses. In combination with the lenses of the spectacle frame, the lenses of the additional frame correct vision in a manner customized to the needs of the user. In a simple, cost-effective and convenient manner, a broad field of sharp vision in all distance ranges is afforded to the user, and therefore significantly improved vision comfort tailored to their requirements is provided.

20 Claims, 1 Drawing Sheet

(56) References Cited

U.S. PATENT DOCUMENTS

| | | |
|---|---|---|
| 5,724,118 A | 3/1998 | Krebs |
| 5,907,384 A | 5/1999 | Kirsch et al. |
| 6,027,214 A | 2/2000 | Graham |
| 6,244,705 B1 | 6/2001 | Ledbetter et al. |
| 6,412,942 B1 * | 7/2002 | McKenna ................ G02C 9/00 351/41 |
| 6,488,372 B1 * | 12/2002 | Park ........................ G02C 9/02 351/57 |
| 6,893,124 B1 | 5/2005 | Kurtin |
| 6,971,744 B1 | 12/2005 | Cummings |
| 7,316,478 B2 | 1/2008 | Periasamy et al. |
| 2008/0013038 A1 | 1/2008 | Guilloux |
| 2011/0181828 A1 | 7/2011 | Yi et al. |

\* cited by examiner

SPECTACLES AND USE OF SPECTACLES HAVING A SPECTACLE FRAME AND AN ADDITIONAL FRAME

FIELD OF THE INVENTION

The invention relates to spectacles as well as a use of spectacles having a spectacle frame having lens disks made of transparent material and an additional frame having lens disks made of transparent material and which additional frame is placed on the spectacle frame so that the lens disks of the spectacle frame and the lens disks of the additional frame at least partially overlap and run approximately parallel, or parallel, to one another.

BACKGROUND OF THE INVENTION

Such spectacles having a spectacle frame and an additional frame that can be placed thereon are known per se. In particular, they are used to equip the spectacle frame with conventionally ground vision-correcting lens disks as a vision aid and the additional frame as sunglasses with tinted lens disks but without vision correction. The user is thus extensively protected against insolation and brightness without changing spectacles and vision being impaired.

Lens disks with different grindings in the top and bottom range with bifocal lens disks are also known in which a near portion is worked into the bottom range in addition to the far portion in the top range. Lens disks with different grindings in the top, middle and bottom range with trifocal lens disks are also known in which a central portion (typically for focus between 50 and 100 cm) is worked in, in addition to the far portion in the top range and the near portion in the bottom range. With these bifocal and trifocal lens disks, there is an optically visible dividing line in the lens disks, and the user has the correct vision correction for each distance only in a narrow visual range, and this vision correction requires continuous customization of visual focus and head posture of the user.

Additionally, varifocal lens disks are known in which a special spectacle lens disk with different refractive powers are used for far and near correction (bifocal) or for far, middle and short correction (multifocal), wherein a stepless grinding of each of the lens disks is worked in for this purpose, in order to have sharp vision in practically all distances between the different far and near points. In such varifocal lens disks, the user however at least tends also to have the proper vision correction (in particular if the difference in vision correction between far and near is great) for each distance only in a narrow visual range which requires continuous customization of visual focus and head posture of the user.

In such universal varifocal lens disks, the transitions between these ranges are fluent and cannot be seen from the outside. The transition between far and near range is also called the progression zone, in which the spherical effect increases continuously as it moves downwards until the near addition is achieved. In the progression zone, the spectacle lens has the corrective effect for ametropia and the additional effect for middle-distance vision. The width of the progression zone depends on the effect of the near addition. It is disadvantageous that this progression zone is smaller the shorter it is and the higher the addition between near and far range.

Ultimately, so-called interview spectacles (also called indoor or workstation spectacles) are known which typically optimally cover the middle field of view between 50 and 100 to 400 cm, wherein distance variants, as required by the user, are conceivable. The use of such spectacles inevitably leads to the user possessing at least two pairs of spectacles and always having to change them as required.

OBJECTS AND SUMMARY OF THE INVENTION

The object of the invention is to design spectacles of the type mentioned at the outset such that the user can change easily between the different distance ranges and the vision corrections can be customized as desired, depending on the effective use thereof when using the spectacle frame without or with an additional frame.

The object is achieved, according to the invention by providing each additional frame that is connectable to the spectacle frame with mounting parts each holding a respective one of the lens disks of the additional frame, and a connecting member that holds the mounting parts to the lens disks of the spectacle frame in a connected state of the additional frame. The connecting member is arcuate and spring-loaded. Manually stretching the connecting member causes the mounting parts to move apart from one another and enables attachment of the additional frame to or removal of the additional frame from the spectacle frame.

According to the invention, the lens disks of the spectacle frame are developed as varifocal lens disks for the purpose of correcting vision for different distance ranges in order to achieve in each case maximum or clear visual acuity for at least one distance range, while the lens disks of the additional frame are developed as single-vision lens disks or varifocal lens disks which, in combination with the lens disks of the spectacle frame, correct vision in a manner customized specifically to the needs of the user.

This results in considerable advantages for a user to the extent that this combination of spectacles with varifocal lens disks and the additional lens disks of the additional frame makes possible, in simple, cost-effective and comfortable manner, sharp vision in all distance ranges over a large area and thus a clearly improved vision comfort customized to the needs of the user.

Thus, for example the varifocal lens disks of the spectacle frame can be designed especially for maximum vision in the long-sightedness range or in the medium to short-distance range, whereas in the medium to short-distance range or in the long-sightedness range, they do not possess the full corrective effect. Dispensing with the full corrective effect in the medium to short range provides the user with a considerable increase in comfort, as this way the otherwise big difference in vision corrections caused by the varifocal lens disk are already extensively eliminated by a slight change in the angle of vision of the eye. Specifically, this increase in comfort is particularly important and useful for the user if the corrections required for the short-distance range deviate relatively strongly from the corrections required for the long-sightedness range.

For example, a further correction can take place with the additional frame and its single-vision lens disks or varifocal lens disks such that the short-distance and middle-distance range is considerably extended by the combination of lens disks of the spectacle frame with the lens disks of the additional frame, and the angle of vision of the eye of the user is clearly increased for these ranges, which brings with it a large increase in comfort for the user when viewing in the short-distance and middle-distance range.

In so doing, the user has only to carry one single spectacle frame and this additional frame instead of two separate spectacle frames, and can thus carry this thin and light additional frame in a trouser, jacket or shirt pocket, and dispense with a separate implement, such as for example a handbag, for an additional spectacle frame.

Also, a user can achieve considerable cost savings when procuring such a pair of spectacles according to the invention, as he does not need two spectacle frames, such as for example when using outdoor and indoor/interview spectacles, and simpler and thus cheaper variants can frequently be used in the lens disks, in particular in the additional frame.

Moreover, he can change simply between visual ranges by attaching or removing this additional frame with a simple movement. If, for example, he wishes to look alternately on the one hand at the screen of his laptop, mobile phone or the like immediately in front of him, and on the other hand at a desktop screen at a distance of 50 to 100 cm, and moreover at a specific long distance, for example a screen, his angle of vision of the eye is not limited, as in the known varifocal or trifocal lens disks. Likewise, he does not need to keep changing whole spectacle frames, as for example he would have to have to hand when using indoor or interview spectacles. He can thus always carry the spectacle frame in any case without changing, and simply apply or remove only the additional frame with a quick manipulation of the spectacle frame.

Such spectacles according to the invention are suitable in particular for people who have vision disorders of long, middle and short-sightedness, and thus require corrective spectacles for long, middle and short distance.

BRIEF DESCRIPTION OF THE DRAWINGS

The invention and further advantages of same are explained in more detail below using embodiment examples, having reference to the drawings. There are shown in.

DETAILED DESCRIPTION OF THE INVENTION

Figure 1:
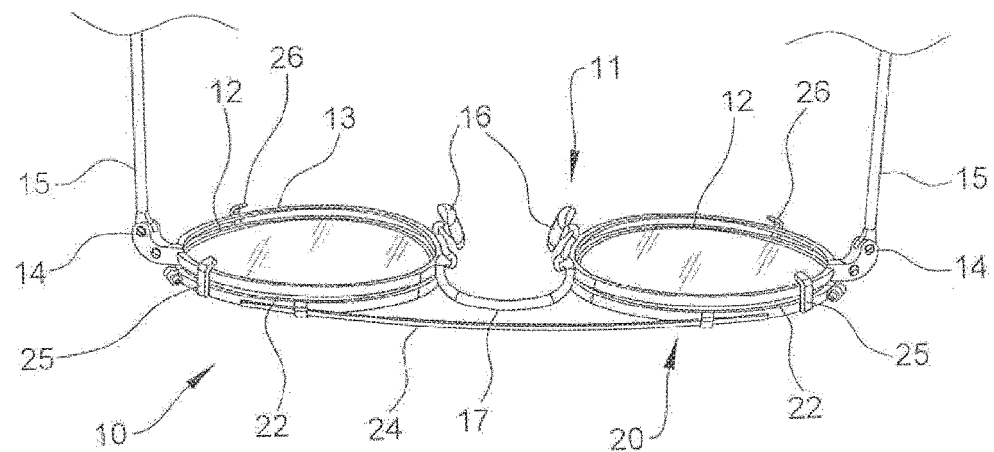
FIG. 1 is a perspective top view of spectacles according to the invention having a spectacle frame and an attached additional frame.

FIG. 1 shows spectacles 10 having a spectacle frame 11 and an additional frame 20 that can be placed on the front of said spectacle frame so as to be removable, both frames having lens disks 12, 22, made of transparent material, such as for example glass. Conventionally, the spectacle frame 11 consists of a mounting 13 holding the lens disks 12, which mounting has a central connecting part 17, on each side of which a joint 14, an arm 15 housed pivotable thereon for holding the frame to the ears, as well as support elements 16 to stabilize the spectacles on the nose.

This mounting 13 with the arms 15 can be developed to have any shape and made from different materials and sizes as required. The lens disks 12, 22 can also be shaped to be correspondingly customized, and can be made from glass, plastic, a combination of these materials or from other materials.

The lens disks 12, 22 both of the spectacle frame 11 and also of the additional frame 20 are each provided with vision correction such that they possess a refracting effect customized to the vision of the user and, therewith, the desired visual acuity, in particular for a short, middle and/or a long distance range, is made possible.

According to the invention, the lens disks 12 of the spectacle frame 11 are developed as varifocal lens disks for the purpose of correcting vision for different distance ranges in order to achieve in each case, maximum or clear visual acuity for at least one distance range, while the lens disks 22 of the additional frame 20 are developed as single-vision lens disks or varifocal lens disks which, in combination with the lens disks 12 of the spectacle frame 11, correct vision in a manner customized specifically to the needs of the user.

Thus, for example the varifocal lens disks of the spectacle frame 11 can be designed especially for maximum vision in the far-sightedness range, whereas in the medium to short-distance range they do not possess the full corrective effect.

The deviation of the compensation of maximum to clear or not fully corrected visual acuity with the vision correction in the short, middle and/or long distance range of the lens disks 12 of the spectacle frame 11 or the combination thereof with the lens disks 22 of the additional frame 20 is established at a specific amount of selectable correction strengths. Thus, for example, short-distance vision correction can be +1.5 dioptres at maximum visual capacity, whereas the effective correction is designed at only +0.75, thus 0.75 dioptres less.

With these spectacles 10 according to the invention, different variations in corrections can be produced by the optician according to the requirements of the user, and thus a novel, very useful possibility for better vision in all distances can be created for a visually-impaired user.

The lens disks 12, 22 are expediently ground and the lens disks are thus designed as lenses. However, the lens disks could also be cast, and be made from different materials, optionally also as tinted disks or those which, if there is great light incidence, for example if it is sunny, evoke a tint in known manner.

With these spectacles 10 according to FIG. 1, when the additional frame 20 is placed on the spectacle frame 11, the lens disks 22 of the additional frame 20 overlap the lens disks 12 of the spectacle frame 11, i.e., they are dimensioned the same size, with the result that the user can utilize a full visual range. Moreover, the lens disks 12, 22 run approximately or precisely parallel to one another, and there is a small distance therebetween.

Figure 3:
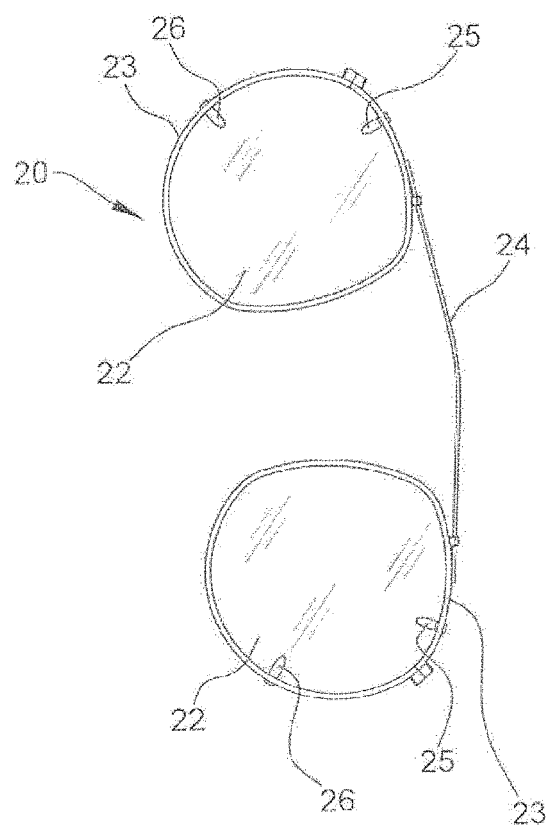
FIG. 3 is a perspective front view of the unattached additional frame.
Figure 2:
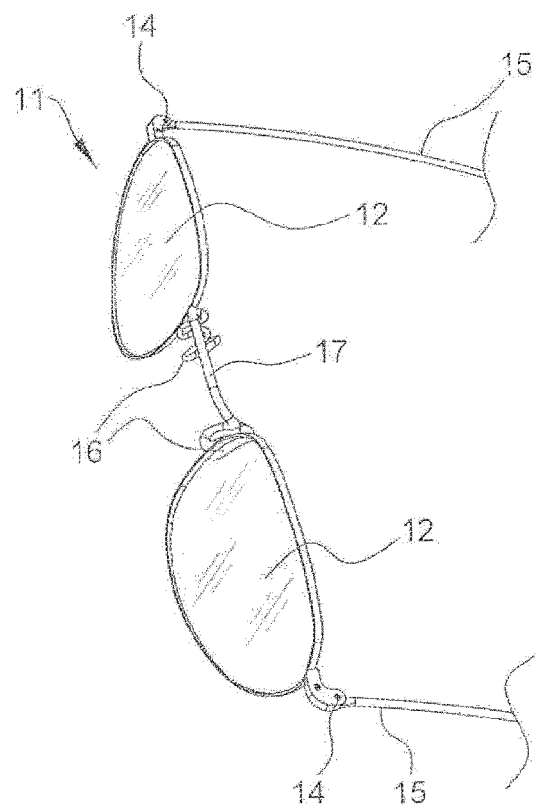
FIG. 2 is a perspective top view of the separate spectacle frame according to FIG. 1.

FIG. 2 shows the spectacle frame 11 and FIG. 3 the additional frame 20 separately. A user can wear just spectacle frame 11 with the varifocal lens disks if he has to change between far, medium and near vision.

The additional frame 20 according to FIG. 3 is advantageously made of a light, thin material, and consists of annular, or similarly shaped, mounting parts 23, the lens disks 22 held by same, a connecting member 24 as well as hook-shaped fixing elements 25, 26, as can also be seen in FIG. 1.

This additional frame 20 is characterized by the fact that this connecting member 24 designed as a small rod is developed slightly arcuate and spring-loaded on the top side. If it is intended to be placed on the spectacle frame 11, slight finger pressure from above on the connecting member 24 can cause same to stretch, and thus the mounting parts 23 with the lens disks are pushed slightly apart from one another. In so doing, these hook-shaped fixing elements 25, 26 to be placed in pairs on the outside of the mounting parts 23 can be pushed over the mounting 13 and, when the finger pressure on the small rod is released, causes same to spring back into arcuate state, as shown, and the mounting parts 23 move again towards one another, and thus these fixing elements 25, 26 clip around the mounting 13, with the result that a rigid connection is produced therebetween.

Alternatively, this can also be carried out with one hand by the additional frame 20 initially being hooked onto one side of the spectacle frame 11, then stretched by means of pushing and pulling, and likewise hooked onto the other side, and after subsequent releasing, hooked onto, and held on, both sides.

When removing the additional frame 20, the sequence can be reversed, and it is thus made possible that this additional frame 20 can also be removed very quickly.

The invention is displayed sufficiently using the above explained embodiment example. Self-evidently, other variants could also be provided. In theory a second additional frame can thus be placed onto this additional frame that can be placed on the front of said spectacle frame so as to be removable, which additional frame could be attached with corresponding fixing elements, similarly to the first one. It would also be conceivable that, instead of the one frame, another additional frame having different vision-correcting lens disks, for example such as those acting like sunglasses, could be used.

The lens disks of the spectacle frame or of the additional frame could also be designed with corrections on the left-hand side different from those on the right-hand side, in particular if the user has vision which differs between the left and right eye.

The type of fixing of the additional frame to the spectacle frame could also be designed differently, such as for example by at least one magnet as a fixing element instead of these hooks, or by plugs or clips. The lens disks could be in contact with one another when placed on the frame.

The lens disks of the additional frame could also cover only one part, for example the bottom part, of the lens disks of the spectacle frame. In so doing, they would be dimensioned to be smaller than the latter lens disks.

The invention claimed is:

1. Spectacles, comprising:
a spectacle frame having lens disks made of transparent material; and
at least one additional frame having lens disks made of transparent material, each of the at least one additional frame being connectable to a front of the spectacle frame and removable from connection to the spectacle frame such that the additional frame has a connected state in which the additional frame is connected to the front of the spectacle frame and a separated state in which the additional frame is not connected to the front of the spectacle frame, wherein in the connected state of the additional frame, the lens disks of the spectacle frame and the lens disks of the additional frame at least partially overlap,
wherein the lens disks of the spectacle frame are varifocal lens disks for correcting vision for different distance ranges in order to achieve maximum or clear visual acuity for at least one distance range,
wherein the lens disks of the at least one additional frame are single-vision lens disks or varifocal lens disks which, in combination with the lens disks of the spectacle frame, correct vision in a manner customized specifically to a user,
each of the at least one additional frame comprising:
mounting parts each holding a respective one of the lens disks of the additional frame, and
a connecting member that holds the mounting parts to the lens disks of the spectacle frame in the connected state of the additional frame, the connecting member being arcuate and spring-loaded, whereby for attachment and removal of the additional frame to the spectacle frame, manually stretching the connecting member causes the mounting parts to move apart from one another and enables their attachment to or removal from the spectacle frame.

2. The spectacles according to claim 1, wherein the lens disks of the spectacle frame and the at least one additional frame are each provided with at least one vision correction such that they possess a refracting effect customized to vision of the user and, therewith, desired visual acuity is made possible.

3. The spectacles according to claim 1, wherein a deviation of compensation of maximum to clear visual acuity with vision correction in short, middle and/or long distance range of the varifocal lens disks of the spectacle frame or the combination thereof with the lens disks of the at least one additional frame is established at a specific amount of selectable correction strengths.

4. The spectacles according to claim 1, wherein the lens disks of the spectacle frame and the at least one additional frame are cast and made from different materials.

5. The spectacles according to claim 1, wherein the lens disks of the spectacle frame and the at least one additional frame overlap in their entirety and have common external dimensions.

6. The spectacles according to claim 1, wherein each of the at least one additional frame comprises fixing elements that attach the additional frame to the front of the spectacle frame.

7. The spectacles according to claim 6, wherein after stretching the connecting member, the fixing elements attached in pairs on an outside of the mounting parts are pushed outwards over a mounting of the spectacle frame, and, when releasing and springing back the connecting member, the mounting parts move back into an arcuate state, and the fixing elements clasp the mounting of the spectacle frame.

8. The spectacles according to claim 1, wherein varifocal lens disks are used for the lens disks of the spectacle frame, which varifocal lens disks correct vision for different distance ranges to achieve the desired vision comfort of the user, and wherein single-vision lens disks or varifocal lens disks are used for the lens disks of the at least one additional frame, which lens disks of the at least one additional frame provide at least one additional vision correction compared with the lens disks of the spectacle frame for different distance ranges in combination with the lens disks of the spectacle frame, wherein the vision corrections provided with the lens disks of the spectacle frame and combined therewith, are customized with the lens disks of the additional frame to vision comfort desired by the user.

9. The spectacles according to claim 1, wherein in the connected state of the additional frame, the lens disks of the spectacle frame and the lens disks of the additional frame are parallel to one another.

10. The spectacles according to claim 1, wherein the connecting member is a rod that is arcuate and spring-loaded on a top side.

11. The spectacles according to claim 1, wherein the transparent material of the lens disks of the spectacle frame and the at least one additional frame is glass.

12. The spectacles according to claim 1, wherein the at least one additional frame consists of two lens disks and two mounting parts.

13. The spectacles according to claim 1, wherein in the connected state of the additional frame, the lens disks of the spectacle frame and the lens disks of the additional frame are spaced apart from one another.

14. The spectacles according to claim 1, wherein in the connected state of the additional frame, the lens disks of the spectacle frame and the lens disks of the additional frame entirely overlap.

15. The spectacles according to claim 1, wherein a deviation of compensation of maximum to clear visual acuity with vision correction in short, middle and/or long distance range of the varifocal lens disks of the spectacle frame or the combination thereof with the lens disks of the at least one additional frame is established at +0.75 diopters.

16. The spectacles according to claim 1, wherein the lens disks of the spectacle frame and the at least one additional frame are tinted lens disks.

17. The spectacles according to claim 1, wherein each of the at least one additional frame further comprises fixing elements that fix each of the mounting parts to a respective portion of a mounting of the spectacle frame that surrounds the lens disks of the spectacle frame.

18. The spectacles according to claim 17, wherein the fixing elements are arranged in pairs on an outside of the mounting parts.

19. The spectacles according to claim 17, wherein the fixing elements are hook-shaped.

20. The spectacles according to claim 6, wherein the fixing elements are hook-shaped.

\* \* \* \* \*